T. Trench. Sheet 1. 3 Sheets.
Printing Press.
No. 13. Reissued Sept. 17. 1839.
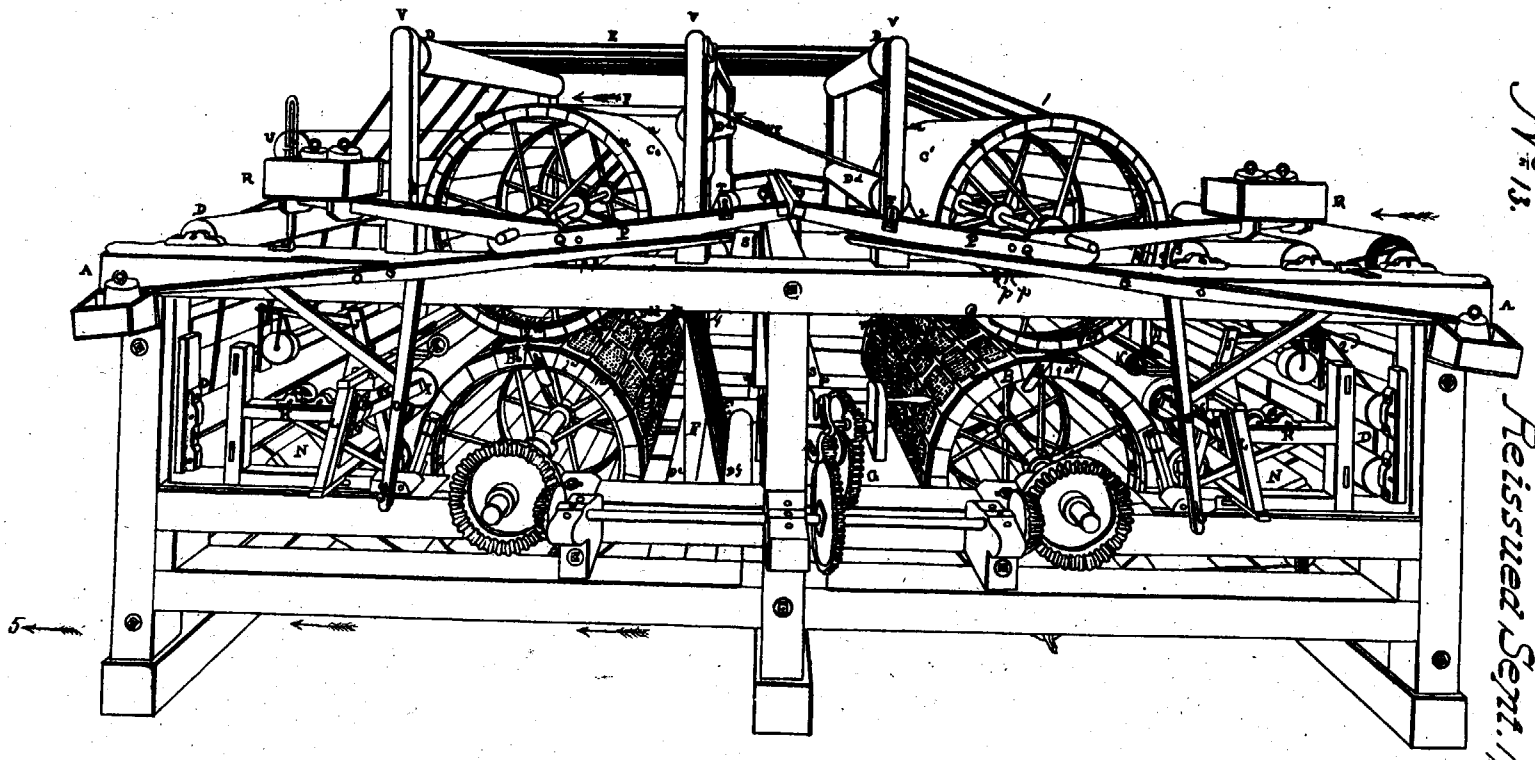

T. Trench. Sheet 2. 3 Sheets.
Printing Press.
No. 13. Reissued Sept. 17. 1839.
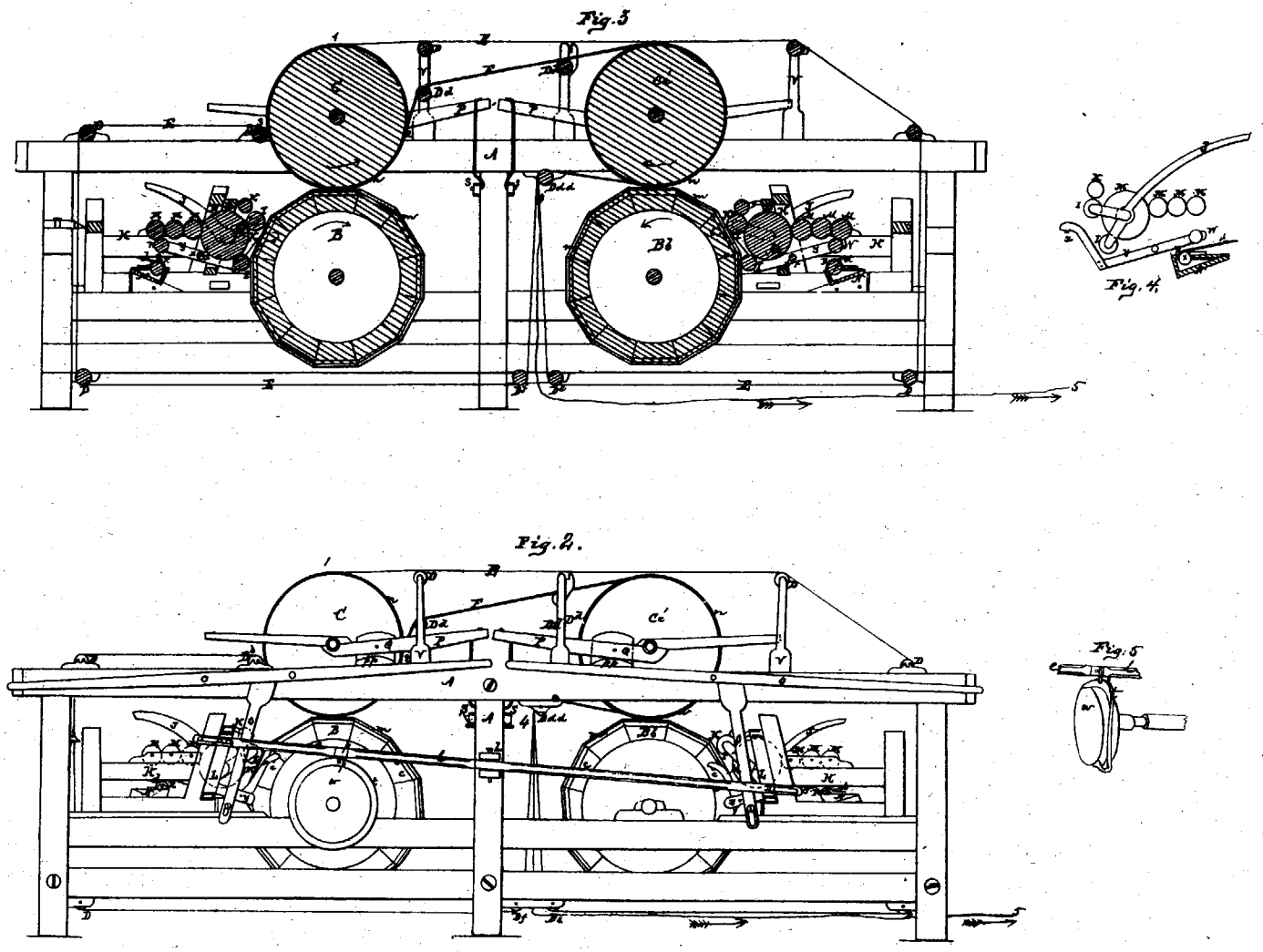

T. Trench. Sheet 3. 3 Sheets.

Printing Press.

No. 13. Reissued Sept. 17. 1839.

UNITED STATES PATENT OFFICE.

THOMAS TRENCH, OF HANOVER, NEW JERSEY.

IMPROVEMENT IN MACHINES FOR PRINTING BOTH SIDES OF A CONTINUOUS SHEET OF PAPER.

Specification forming part of Letters Patent No. 468, dated November 20, 1837; Reissue No. 13, dated September 17, 1839.

*To all whom it may concern:*

Be it known that I, THOMAS TRENCH, of Hanover, in the county of Morris and State of New Jersey, have invented certain new and useful improvements in the machinery for printing, by which machinery both sides of a continuous sheet or web of paper may, as it is delivered from the cylinder of the paper-machine, receive an impression as the paper is passed once through my machine; and I do hereby declare that the following is a full and exact description thereof.

In the accompanying drawings, Figure 1 is a perspective view of the machine. Fig. 2 is an elevation of the rear or opposite side. Fig. 3 is a longitudinal and vertical section through the middle, the machine being supposed to stand in the same direction as in Fig. 2. Figs. 4 and 5 are parts in detail, to be presently explained.

In each of the figures, like parts are designated by the same letters of reference.

A A, Fig. 1, is the frame of the machine, represented as made of wood; but it may of course be formed of iron, in which case it would undergo that change of form which would be appropriate to such material.

B and B *b* are two type-cylinders, upon which the stereotype-plates are to be secured. They are for this purpose made polygonal, the cylinders being of such diameter and the faces of the polygons of such width as shall adapt them to the particular kind of work to be executed. These type-cylinders are formed by affixing staves of wood onto the peripheries of wheels, through the centers of which run the cylinder-shafts, which revolve in proper bearings on the frame of the machine.

Figure 6:
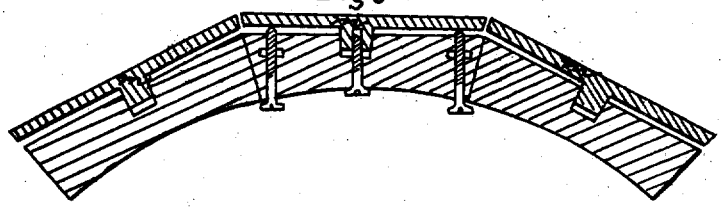

The staves, which are distinctly shown in the drawings, are to be attached to the wheels by means of buttons, thumb-screws, or any other device which will admit of their being readily detached and others substituted for them. I also use type-cylinders of different diameters, and varying in their number of faces, according to the size of the page to be printed. The lower sides of the staves are made concave to adapt them to the form of the peripheries of the wheels, and their upper sides flat to receive the stereotype-plates, which are to be fastened to them by screws, clasps, or other well-known means. Across the ends of each stave are affixed pieces of iron or other hard substance, as shown at *m m*. These pieces are to rise to the height of the stereotype-plates, or nearly so, and they are to be so attached as to admit of their being raised or lowered, as by adjusting them in this particular the strength of the impression is to be regulated. These plates may be about an inch in width, and in their combined capacity they constitute a polygonal rim or bearing around the type-cylinders. Above the type-cylinders are two impression-cylinders, C and C *c*, which are for giving the impression to the sheet by their pressure on the type-cylinders. These may be made of wood or of metal. They are to be covered with some yielding substance—such as felt, leather, gum-elastic, &c.—for the purpose of giving a regular impression and of protecting the faces of the type-plates from injury. Around each end of these impressing-cylinders there are iron loops *n n*, adapted to run upon the bearers *m m* of the type-cylinders. Their height above the impressing-cylinders may be from a sixteenth to an eighth of an inch, and as the bearings *m* are adjustable the pressure of the impressing-cylinder upon the types may by this provision be perfectly checked and regulated. This may be effected in various ways—as, for example, by three screws operating on each bearing *m* in the well-known manner shown in Fig. 6.

The bearings for the gudgeons *a a* of the impressing-cylinders are in the levers or side pieces, P P′, of a frame, which works on fulcra at Q Q in standards *p p* on the main frame, the two portions P P′ of said frame being firmly bolted together at their place of juncture; or they may consist of one continuous piece.

At the end of the levers P′ or sides of the frame are boxes R, for containing weights, which may be increased or diminished to cause the impressing-cylinders to bear with greater or less force on the type-cylinders.

S S are rods, attached at their upper ends to cross-pieces, which connect the levers P P on each side of the machine with each other. The lower ends of these rods are attached to levers S′ S′, and by pressing upon these levers the impressing-cylinders may be raised from the type-cylinders. The vibration of the frame and levers P P′ enables the impressing-cylinders to pass regularly over the faces of the type-cylinders and round the corners or angles at their junction with each other.

The two type-cylinders may be geared together by toothed wheels, as shown at G G G, so as to operate correctly in conjunction with each other, or they may be driven by bands and whirls. The second of the type-cylinders, B *b*, I make about a fourth of an inch greater in diameter than the first, B, to give tension to the paper and keep it tight and smooth in its passage from one cylinder to the other. The stereotype-plates are so arranged on the faces of the cylinders as that in printing both sides of the sheet they shall make good register.

The sheet to be printed is conducted between two systems of endless tapes, on the same principle as in some other cylinder printing-machines; but as this machine is intended to print on both sides of a continuous sheet as it is delivered from the machine for making paper in an endless web or sheet, the systems of tapes are so arranged as to adapt them to this particular purpose.

E and E′ are the two systems of tapes, which pass around rollers D D, by which they are distended and have the proper direction given to them. The first system of tapes, E, passes around three-fourths of the first cylinder, C—that is to say, from the point No. 1 to the point No. 2—as shown in each of the Figs. 1, 2, and 3, and the second system of tapes, E′, passes one-half around the same cylinder C—that is to say, from No. 3 to No. 2—embracing the under side of said cylinder. These tapes may vary in number and position, as they must be so arranged as to pass on the margin and in the spaces between each page. They remain in contact with the paper on both sides of it during its passage through the machine, by which means the end of the paper being once received or taken in between the two systems of endless tapes at the point No. 3, it will continue its course along with the tapes between the cylinders, while at the same time the paper is brought into the proper situation for being printed upon on both sides successively without destroying the register or proper coincidence of the pages on the opposite sides of the sheet.

From the point 2 on cylinder C the two systems of tapes, embracing the paper between them, pass over guide-rollers D *d* D *d*, and thence to cylinder C *c*, embracing and continuing around this cylinder, and passing between it and the type-cylinder B *b*, where the sheet receives its second impression on the side opposite to that first printed. The printed sheet and systems of tapes pass from the second type-cylinder over a guide-roller, D *d d*, after which the two systems separate and leave the printed sheet free. The first system of tapes passes down to and around the roller D *e*, and thence around rollers D D D until it arrives again at cylinder C, as will be clearly seen by inspecting the drawings.

From the roller D *d d* the second system of tapes passes down to and around the roller D *f*, and thence around rollers D D D to the point 3 on the cylinder C, as shown in the drawings.

U is a tightening-roller, which bears upon the endless tapes, its gudgeons rising and falling in standards furnished with slots to admit of their so doing. The continuous sheet, after being printed and freed from the guide-tapes, is carried off in the direction indicated by the arrows pointing toward No. 5, and is passed over the cylinder of a drying-machine, or otherwise disposed of, as may be preferred.

In its original construction the inking apparatus used by me is similar to such as has been heretofore employed for the same purpose, but as it is novel in several of its particular arrangements I proceed to describe the construction of this part.

H H are frames for holding the ink-boxes, rollers, and other parts of the inking apparatus. The frames H slide upon the main frame A, and are moved toward or from the type-cylinders by the action of levers O O. The ink is put upon the types by composition-rollers. (Marked I I.) These rollers have their gudgeons running in boxes on the levers J J. (Shown in part in Figs. 1, 2, and 3, but more distinctly in the sectional view of this part, Fig. 4.) The gudgeons of the large roller M also run in these levers, there being one such at each end of the system of inking-rollers. The upper inking-roller, I, is upon separate arms *i*, so that it bears by its own weight upon the type-cylinders. These rollers are moved by their friction on the iron plates *m*, on the ends of the staves, and rise and fall by the action of the sides and angles of the said cylinders upon them. The rollers I touch and take the ink from the large roller M, to which by their friction they communicate motion. The levers J J by their gravity serve to press the lower inking-rollers against the types.

M′, $M^2$, and $M^3$ are auxiliary inking-rollers, to the rear one of which, $M^3$, the ink is first communicated. This system of rollers receives motion from each other by the contact of their elastic covering. K is a distributing-roller, operating upon the upper roller, I. This distributing-roller has a vibratory motion longitudinally, its gudgeons running in two arms, which are made capable of rising and falling with the roller I, said arms being hung to the vibrating frame L.

The frame L, which carries the distributing-roller, slides endwise in the frame H. It is moved backward and forward by a vibrating lever, *l l*. (Shown at the rear side of the machine, Fig. 2.) This lever works on a joint-pin at its center, *h*, attached to the frame A. The lever *l l* is attached at its two ends to the two sliding frames L L, and it is made to vibrate laterally by means of a wheel, *w*, having on its periphery an undulating thread or projection, *t t*. (Shown separately in Fig. 5.) This thread is embraced by two pins projecting from the lever, to which it consequently communicates the desired motion, as this in its turn does to the distributing-roller.

Figure 7:
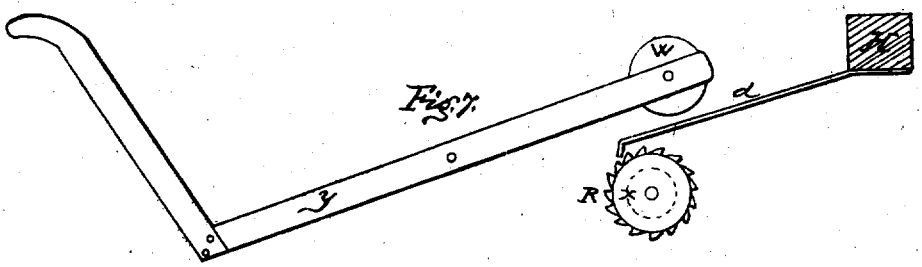

N, Figs. 1, 2, 3, and 4, shows the box for containing the ink, which box is fastened in the frame H. It has a metallic roller (marked X, Fig. 4) revolving in it, its lower side being immersed in the ink, a strip of iron, called a "doctor," operating upon it in the ordinary mode, to remove the superfluous ink therefrom. On one of the gudgeons of this roller there is a ratchet-wheel, as at R, and when the roller W, which takes the ink from the metallic roller X, is moved down upon it, a spring-dog, *d*, attached to the frame H, is pressed down by the lever *y*, and catches in said ratchet-wheel R, moves it round to a small distance, and brings up a fresh supply of ink to the roller W, which the latter communicates to the system of inking-rollers. This arrangement of the spring-dog and ratchet-wheel is shown separately in Fig. 7. The roller W has its gudgeons running in the ends of two parallel levers—one at each of its ends. These levers are shown at *y*, Figs. 2, 3, and 4. They move on joint-pins or fulcra in the frame H, so as to admit of the rise and fall of the roller in its action of receiving and giving ink. To carry this roller down there are pins *c c*, Fig. 2, projecting out from the ends of the type-cylinders, which, in the revolution of said cylinders, catch against the ends *x* of the levers *y*, raise them, and consequently depress the roller W. When relieved from the action of these pins, the lever *y* falls by the superior gravity of its longer end *x*, when the roller W is brought into contact with the rear roller, $M^3$.

While the press is in action the frames H H and their contents are in a situation for the inking-rollers to supply the types with ink; but when it is put out of action, by raising the impressing-rollers the frames H H are made to slide back by the following device:

O O′ are levers connected to the frames H H at the lower ends of the arm O′ and weighted at the outer ends of their horizontal arms, so as to bring the inking-rollers with any desired degree of force against the type-cylinders.

T T are projecting pieces attached to the levers P P, and when they are brought down for the purpose of raising the impressing-cylinders these projecting pieces come into contact with the inner ends of the levers O O and cause the frames H H to slide back. Motion in the first instance may be given to the machine by any adequate motive power.

Having thus fully described the construction of my printing-machine and shown how the same operates, I do hereby declare that I do not claim to be the inventor of a double-cylinder printing-press, machines so denominated having been previously in use, although differing, as I verily believe, in many essential particulars from that herein described; but

What I do claim as my invention, and desire to secure by Letters Patent, is—

1. The particular manner in which I have arranged and combined the respective parts together, so as to print upon both sides of a continuous sheet of paper as it is delivered from the paper-machine, and thus to produce a new and useful effect by means substantially new—that is to say, the manner of constructing the polygonal type-cylinders so as to admit of their being varied in size and in the number of their polygonal faces—by which means they are adapted to the printing from plates of different sizes, such variation being effected by changing the staves which form the peripheries of these cylinders.

2. The employment of the bearing-pieces *m m* on the ends of each of the staves of the type-cylinders, said bearing-pieces being made adjustable for the purpose of sustaining and regulating the pressure of the impressing-cylinders, acting in combination with and by the running thereon of the iron rims or hoops *n n* on the ends of said cylinders, causing the pressure, by this arrangement and by the rising and falling of the impression-cylinders, to be equalized, whether made upon the flat surfaces of the polygonal faces or in passing the angles between them.

3. In the inking apparatus, the combination of the lever *l l* with the slides L L, and with the undulating wheel *w*, for the purpose of giving a vibratory motion to the distributing-rollers, as set forth.

4. The manner of causing the levers P P, when depressed, in order to raise the impressing from the type rollers to act upon the frame H and cause the inking-rollers to recede from the type-cylinders, the same being effected by the intervention of the levers O O in the manner described, not intending by the foregoing description and claims to confine myself to the precise manner of forming and arranging the respective parts as herein set forth, but to vary these as I may think proper, while I attain the same end by means substantially the same.

THOMAS TRENCH.

Witnesses:
STEPHEN VAIL,
JAS. CLARK.